United States Patent
Rozman et al.

(10) Patent No.: US 8,536,730 B2
(45) Date of Patent: Sep. 17, 2013

(54) ELECTRIC POWER GENERATING AND DISTRIBUTION SYSTEM COMPRISING A DECOUPLING FILTER AND A SOLID STATE POWER CONTROLLER

(75) Inventors: Gregory I. Rozman, Rockford, IL (US); Steven J. Moss, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 547 days.

(21) Appl. No.: 12/834,399

(22) Filed: Jul. 12, 2010

(65) Prior Publication Data

US 2012/0007425 A1 Jan. 12, 2012

(51) Int. Cl.
*H02M 7/02* (2006.01)

(52) U.S. Cl.
USPC .............. 307/11; 323/222; 323/268; 323/269; 323/270; 323/272

(58) Field of Classification Search
USPC ...................................... 307/11, 25
See application file for complete search history.

(56) References Cited

U.S. PATENT DOCUMENTS

| | | | |
|---|---|---|---|
| 5,418,707 A * | 5/1995 | Shimer et al. | 363/65 |
| 6,246,559 B1 | 6/2001 | Sanders et al. | |
| 6,271,651 B1 * | 8/2001 | Stratakos et al. | 323/282 |
| 7,453,678 B2 | 11/2008 | Beneditz et al. | |
| 7,564,147 B2 | 7/2009 | Michalko | |
| 2004/0080165 A1 * | 4/2004 | Geis et al. | 290/52 |
| 2006/0022648 A1 * | 2/2006 | Ben-Yaakov et al. | 323/222 |
| 2010/0308582 A1 * | 12/2010 | Rozman et al. | 290/31 |
| 2010/0308584 A1 * | 12/2010 | Coates et al. | 290/44 |

OTHER PUBLICATIONS

Hamilton Sundstrand Corporation, US Patent Application PA-007947-US, Starting/Generating System with Multi-Functional Circuit Breaker.
Hamilton Sundstrand Corporation, US Patent Application PA-0012359-US, Multi-Tasking Power Processor for a Vehicle Electric System.
Hamilton Sundstrand Corporation, US Patent Application PA-0013103-US, SSPC with active Current Limiting.

* cited by examiner

*Primary Examiner* — Rexford Barnie
*Assistant Examiner* — Toan Vu
(74) *Attorney, Agent, or Firm* — Cantor Colburn LLP

(57) ABSTRACT

A method for operating an electric power generating system (EPGS) includes, in one aspect, detecting current limiting conditions in the SSPC, wherein the SSPC includes a main solid state switch in series with an output filter that includes a first solid state switch, and wherein a decoupling filter comprises a second solid state switch. Another aspect includes, based on the detection of the current limiting conditions in the SSPC, opening the first solid state switch and the second solid state switch; detecting an absence of current limiting conditions in the SSPC; and, based on the detection of the absence of current limiting conditions in the SSPC, closing the first solid state switch and the second solid state switch, and powering a direct current (DC) load by a generator of the EPGS via the output filter and the SSPC.

20 Claims, 5 Drawing Sheets

ELECTRIC POWER GENERATING AND DISTRIBUTION SYSTEM COMPRISING A DECOUPLING FILTER AND A SOLID STATE POWER CONTROLLER

FIELD OF INVENTION

The subject matter disclosed herein relates generally to the field of electric power generation and distribution systems.

DESCRIPTION OF RELATED ART

A hybrid vehicle may comprise an electric power generating system (EPGS) integrated with a power distribution system. The power distribution unit may comprise one or more solid state power controllers (SSPCs). Solid State Power Controllers (SSPCs) are used in power distribution systems in, for example, military or aerospace applications, as alternatives to traditional electromechanical circuit breakers. An SSPC may distribute power to and protect various electrical loads. In comparison to electromechanical devices, SSPCs provide relatively fast response time, and may eliminate arcing during turn-off transient and bouncing during turn-on transient. SSPCs also do not suffer severe degradation during repeated fault isolation in comparison with electromechanical devices. SSPCs may be relatively small in weight and size. SSPCs facilitate advanced protection and diagnostics, allowing for efficient power distribution architectures and packaging techniques. However, because the switching device within an SSPC may produce excessive heat during current limiting at elevated current levels due to internal resistances, relatively complex thermal management techniques may be required, that may add complexity, cost and weight to the power distribution system.

U.S. patent application Ser. No. 12/720,703, filed on Mar. 10, 2010, and assigned to Hamilton Sundstrand Corp., which is herein incorporated by reference in its entirety, discusses current limiting performed by pulse width modulation (PWM) of a solid-state switch of an SSPC, utilizing the inductance of the feeder between the SSPC output and the DC load. In some applications, such as an aircraft application, the DC bus voltage may be relatively low (about 270 Vdc), and the feeder may have considerable inductance due to a relatively long length. However, in other applications, such as a military ground vehicle, the DC bus voltage may be relatively high (over about 600 Vdc), and the feeder may be relatively short, and have a relatively low inductance. Such high voltage and low feeder inductance conditions may preclude current limiting using PWM of an SSPC switch, even at very high switching frequencies.

BRIEF SUMMARY

According to one aspect of the invention, an electric power generating system (EPGS) includes a generator configured to power a direct current (DC) load via a power distribution module, the power distribution module comprising a solid state power converter (SSPC); a decoupling filter connected between the generator and the power distribution module, the decoupling filter comprising an inductor connected in parallel with a resistor and a solid state switch, the resistor and solid state switch being connected in series; wherein, during current limiting conditions in the SSPC, the solid state switch of the decoupling filter is configured to be open, and during the absence of current limiting conditions in the SSPC, the solid state switch of the decoupling filter is configured to be closed.

According to another aspect of the invention, a method for operating a decoupling filter of an electric power generating system (EPGS), the EPGS comprising a power distribution module comprising a solid state power converter (SSPC), the method including powering a direct current (DC) load by a generator via the SSPC of the power distribution module, wherein the decoupling filter is connected between the generator and the power distribution module, and wherein the decoupling filter comprises an inductor connected in parallel with a resistor and a solid state switch, the resistor and solid state switch being connected in series; during current limiting conditions in the SSPC, opening the solid state switch of the decoupling filter; and during the absence of current limiting conditions in the SSPC, closing the solid state switch of the decoupling filter.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of a decoupling filter for an electric power generating and distribution system comprising an SSPC, and methods of operating a decoupling filter for an electric power generating and distribution system comprising an SSPC, are provided, with exemplary embodiments being discussed below in detail. Use of the decoupling filter allows SSPC technology to be applied to distribution and protection of DC loads, including constant power loads, such as DC-DC converters, export inverters and motor drives, in a high voltage DC power generating and distribution system, which may have relatively low feeder inductance. Current limiting capability at increased DC bus voltage levels may be improved, and inrush current during soft start of capacitive loads may be controlled. Interaction between load channels during overload conditions in any one of the load channels may also be reduced. Voltage regulation at a point of regulation (POR) and power quality on the system bus during current limiting conditions at one or more of the load channels is also improved. Filtering requirements at the front end of the individual loads may also be reduced, and pre-charge function at the individual loads may be eliminated, resulting in lower overall system weight, size, and cost. Lastly, system safety is improved by containing high voltage, high current DC power within the power conversion unit (PCU).

Figure 1:
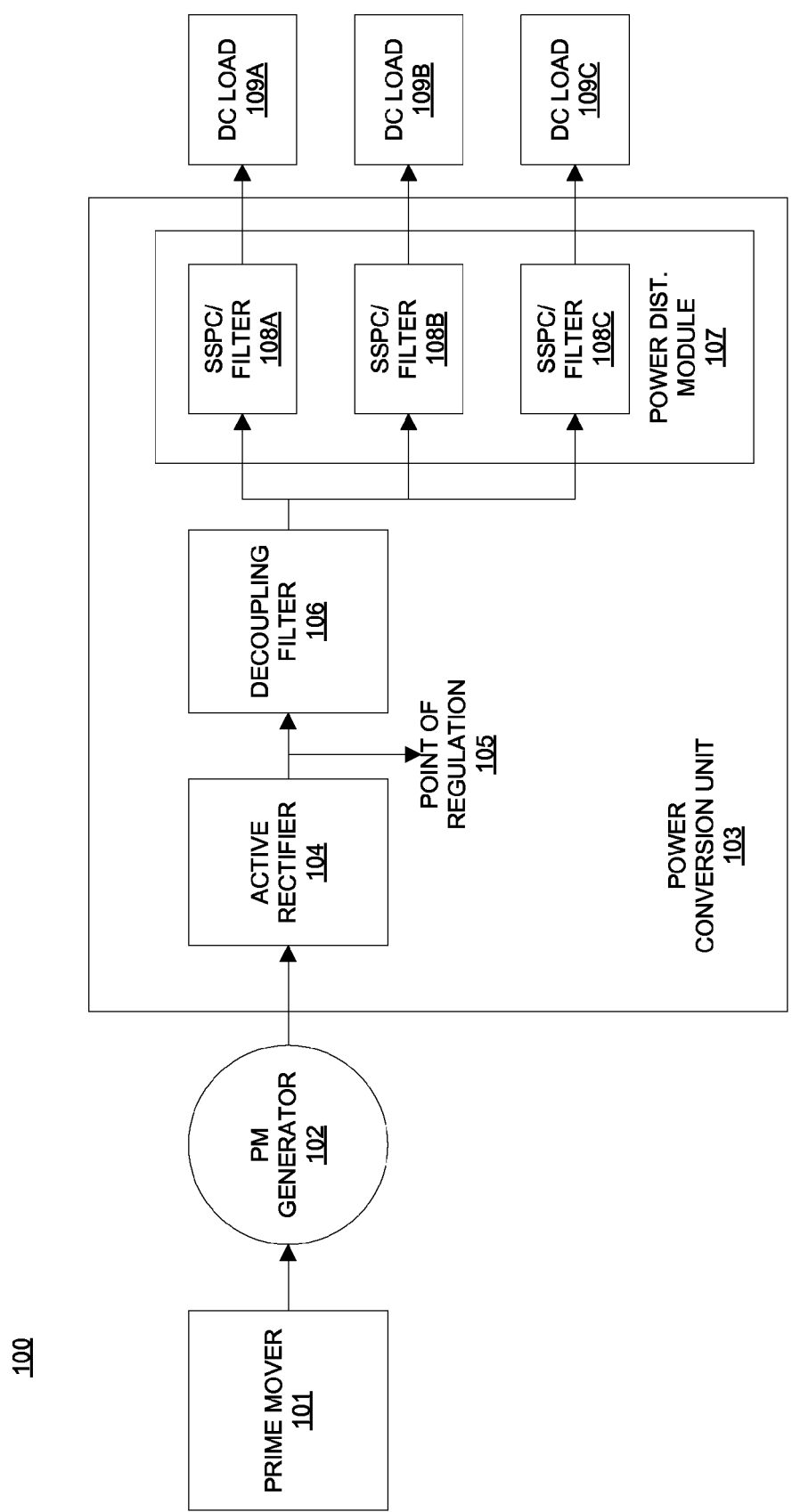
FIG. 1 illustrates an embodiment of an electric power generating and distribution system comprising a permanent magnet generator.

FIG. 1 illustrates an electric power generating and distribution system 100 comprising a permanent magnet (PM) generator 102 that generates power from the motion of a prime mover 101. The PCU 103 connected to the PM generator 102 controls and converts the power from generator 102 to power DC loads 109A-C. PCU 103 comprises active rectifier 104, decoupling filter 106, and a power distribution module 107. Power distribution module 107 includes a plurality of SSPCs 108A-C. The SSPCs 108A-C of power distribution module 107 are each connected to a respective DC load 109A-C. Each SSPC 108A-C provides load protective functions for respective DC load 109A-C, including current limiting during shorted load and inrush current control during capacitive load pre-charge. SSPCs 108A-C and DC loads 109A-C are shown for illustrative purposes only; the power distribution module 107 may comprise any appropriate number of SSPCs, each connected to a respective load. The active rectifier 104 controls the system bus voltage at the point of regulation (POR) 105 in response to variable voltage received from the PM generator 102 and variable load conditions. Decoupling filter 106 minimizes voltage distortion at the POR 105 during overload conditions at any of the SSPCs 108A-C. The decoupling filter 106 comprises a solid-state switch that controls the damping resistance and inductance across decoupling filter 106 based on the operating conditions in power conversion unit 103, which is discussed below in further detail with respect to FIG. 4. SSPCs 108A-C may also each comprise an optional solid state switch that controls the damping resistance and inductance across the SSPC based on the operating conditions in the SSPC, which is discussed below in further detail with respect to FIG. 5.

Figure 2:
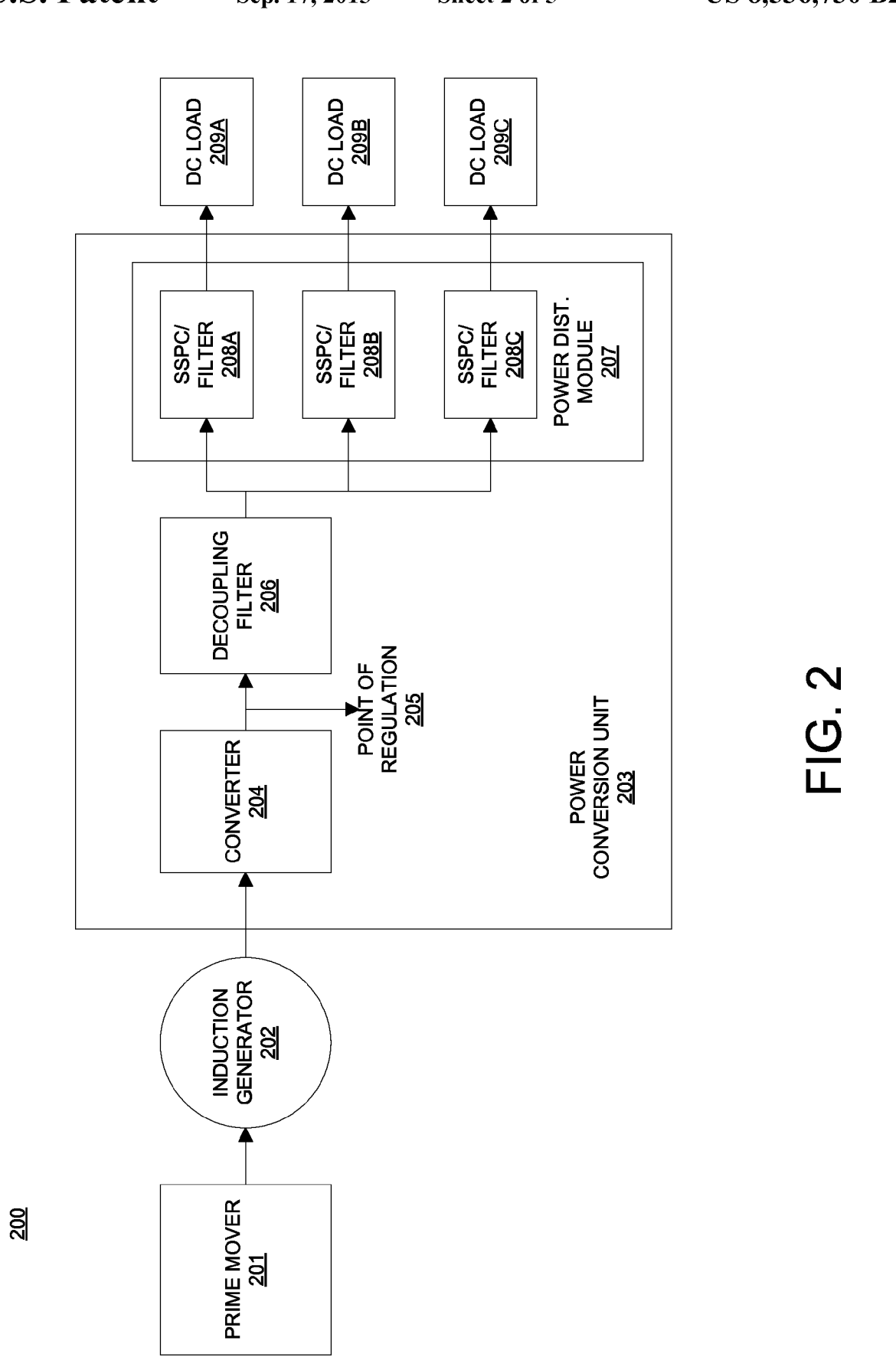
FIG. 2 illustrates an embodiment of an electric power generating and distribution system comprising an induction generator.

FIG. 2 illustrates an electric power generating and distribution system 200 comprising an induction generator (IM) 202 that generates power from the motion of a prime mover 201. PCU 203 connected to the IM generator 202 comprises converter 204, a decoupling filter 206, and a power distribution module 207, comprising a plurality of SSPCs 208A-C. The SSPCs 208A-C of power distribution module 207 are each connected to a respective DC load 209A-C. Each SSPC 208A-C provides load protective functions for respective DC load 209A-C, including current limiting during shorted load and inrush current control during capacitive load pre-charge. SSPCs 208A-C and loads 209A-C are shown for illustrative purposes only; the power distribution module 207 may comprise any appropriate number of SSPCs, each connected to a respective load. Decoupling filter 206 minimizes voltage distortion at the POR 205 during overload conditions at one or more of the SSPCs 208A-C. The decoupling filter 206 comprises a solid-state switch that controls the damping resistance of decoupling filter 206 based on the operating conditions in power conversion unit 203, which is discussed below in further detail with respect to FIG. 4. SSPCs 208A-C may also each comprise an optional solid state switch that controls the damping resistance and inductance across the SSPC based on the operating conditions in the SSPC, which is discussed below in further detail with respect to FIG. 5.

Figure 3:
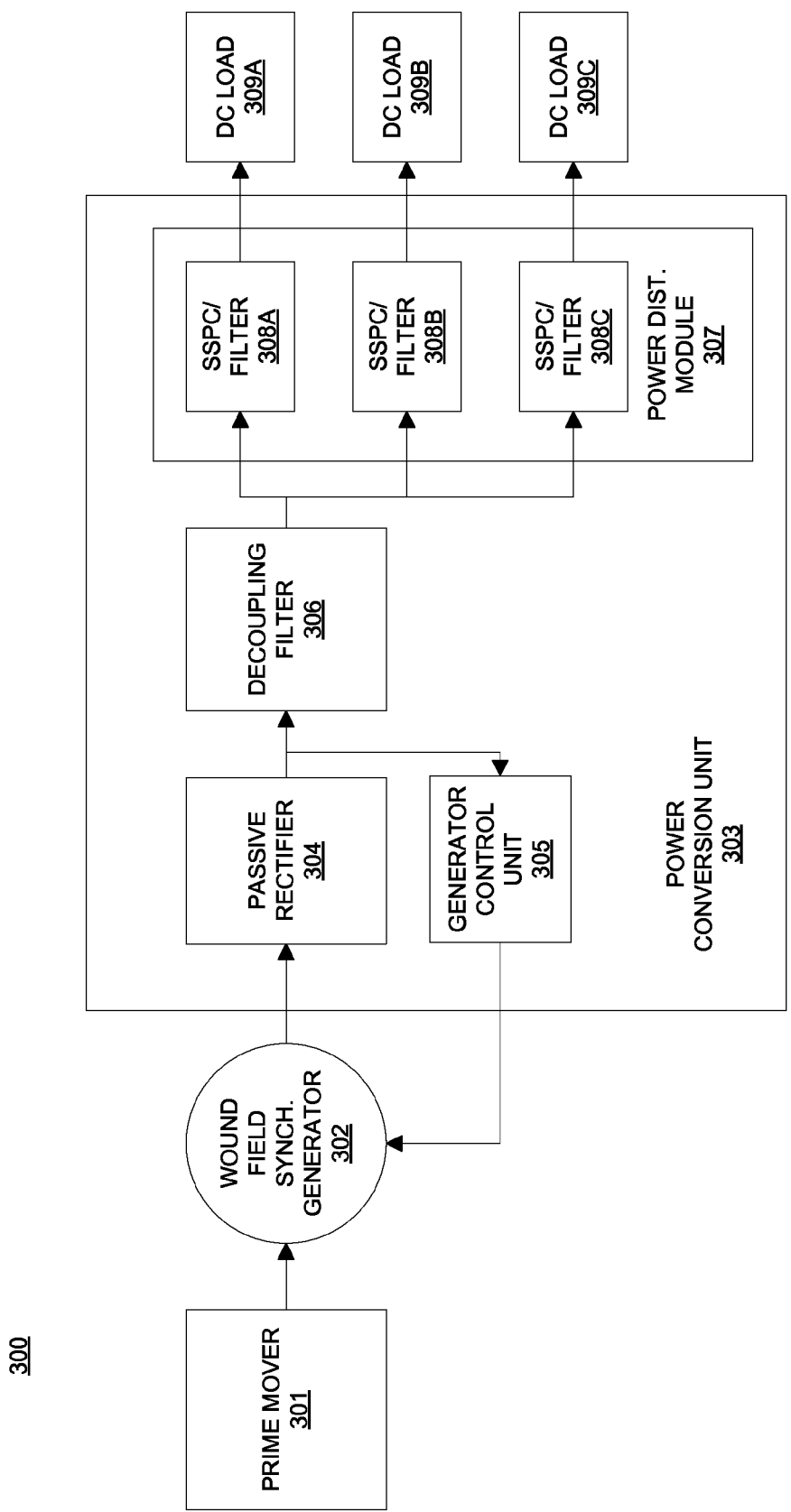
FIG. 3 illustrates an embodiment of an electric power generating and distribution system comprising a wound field synchronous generator.

FIG. 3 illustrates an electric power generating and distribution system 300 comprising a wound field synchronous generator (WFSG) generator 302 that generates power from the motion of a prime mover 301. PCU 303 connected to the WFSG 302 comprises passive rectifier 304, generator control unit (GCU) 305, decoupling filter 306, and power distribution module 307. Generator control unit 305 controls WFSG 302 based on conditions at the point of regulation located between passive rectifier 304 and decoupling filter 306. Power distribution module 307 comprises a plurality of SSPCs 308A-C, which are each connected to a respective DC load 309A-C. Each SSPC 308A-C provides load protective functions for respective DC load 309A-C, including current limiting during shorted load and inrush current control during capacitive load pre-charge. SSPCs 308A-C and loads 309A-C are shown for illustrative purposes only; the power distribution module 307 may comprise any appropriate number of SSPCs, each connected to a respective load. Decoupling filter 306 minimizes voltage distortion in the system 300 during overload conditions at one or more of the SSPCs 308A-C. The decoupling filter 306 comprises a solid-state switch that controls the damping resistance of decoupling filter 306 based on the operating conditions in power conversion unit 303, which is discussed below in further detail with respect to FIG. 4. SSPCs 308A-C may also each comprise an optional solid state switch that controls the damping resistance and inductance across the SSPC based on the operating conditions in the SSPC, which is discussed below in further detail with respect to FIG. 5.

Figure 4:
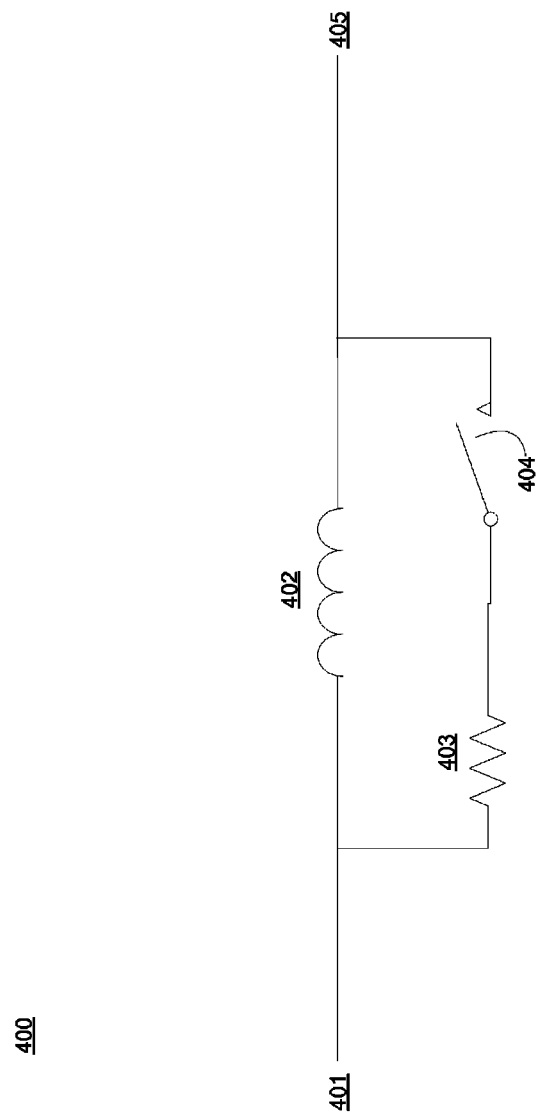
FIG. 4 illustrates an embodiment of a decoupling filter.

FIG. 4 illustrates an embodiment of a decoupling filter 400, which may comprise any of decoupling filters 106, 206, or 306. Decoupling filter 400 comprises an inductor 402 connected in parallel with a damping resistor 403 connected in series with a solid state switch 404. Input 401 may be connected to the POR (105, 205) in the embodiments shown in FIGS. 1 and 2, and to the output of the passive rectifier 304 in the embodiment shown in FIG. 3. Output 405 is connected to the power distribution module (107, 207, 307). During normal operation, the solid state switch 404 is closed to provide system damping across the decoupling filter 400 from damping resistor 403. When current limiting conditions are present in an SSPC (any of SSPCs 108A-C, 208A-C, 308A-C) located in the power distribution module (107, 207, 307) connected to the decoupling filter 400, the solid state switch 404 is opened to provide additional output impedance from inductor 402 across decoupling filter 400. The provision of additional output impedance during overload conditions by opening of solid state switch 404 acts to minimize voltage distortion and improve power quality in the EPGS (100, 200, 300) during current limiting.

Figure 5:
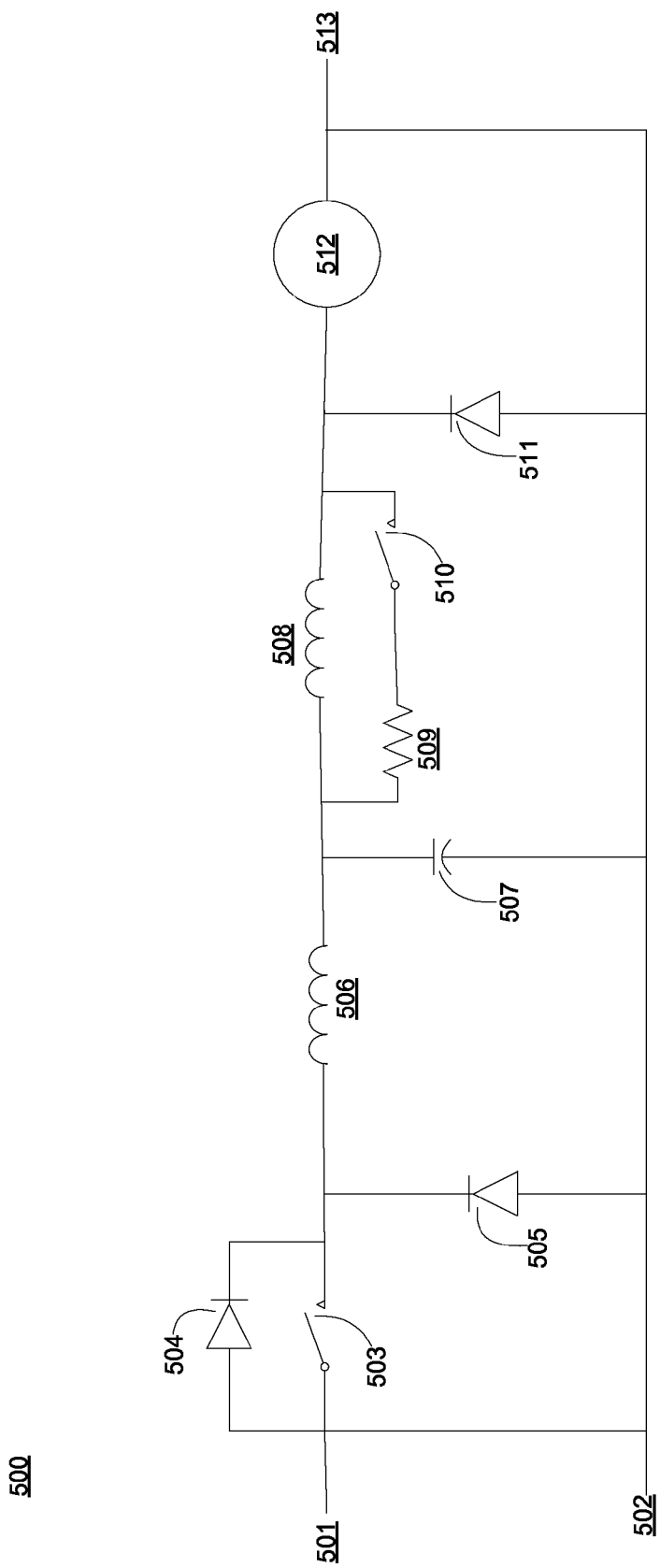
FIG. 5 illustrates an embodiment of an SSPC.

FIG. 5 illustrates an embodiment of an SSPC 500, which may comprise any of SSPCs 108A-C, 208A-C, or 308A-C in a power distribution modules (107, 207, 307). Input 501 is connected to the output 405 of the decoupling filter (106, 206, 306). During normal operation, power flows across SSPC 500 from input 501 through main solid-state switch 503 to output 513, which is connected to a DC load (109A-C, 209A-C, 309A-C). Main solid state switch 503 is connected across diode 504. Main solid state switch 503 protects its associated EPGS by disconnecting a faulty load connected to the SSPC 500, limiting inrush current during pre-charge of capacitive loads via pulse width modulation, and provides current limiting during overload conditions via pulse width modulation in response to the current data received from output current sensor 512. Overvoltage protection diodes 505 and 511 are connected on the output of switch 503 and filter inductor 508 respectively to a common voltage received from input 502. The SSPC 500 further comprises an output filter comprising inductor 506, capacitor 507, and inductor 508, connected in parallel with a damping resistor 509 connected in series with a second solid state switch 510. Second solid state switch 510 is closed to provide additional system damping across the output filter from resistor 509 during current limiting mode of the SSPC 500, and opened during normal operation of SSPC 500 in order to improve filtering.

The technical effects and benefits of exemplary embodiments include improved power quality and minimized voltage distortion in an EPGS during short circuit conditions.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electric power generating system (EPGS), comprising:
   a generator configured to power a direct current (DC) load via a power distribution module, the power distribution module comprising a solid state power converter (SSPC) connected to the DC load, the SSPC comprising a main solid state switch in series with an output filter, the output filter comprising a first inductor connected in parallel with a first resistor and a first solid state switch, the first resistor and first solid state switch being connected in series, the SSPC being configured to:
      open the first solid state switch based on detection of current limiting conditions in the SSPC; and
      close the first solid state switch based on detection of an absence of current limiting conditions in the SSPC; and
   a decoupling filter connected between the generator and the power distribution module, the decoupling filter comprising a second inductor connected in parallel with a second resistor and a second solid state switch, the second resistor and second solid state switch being connected in series, the decoupling filter being configured to:
      open the second solid state switch based on the detection of the current limiting conditions in the SSPC; and
      close the second solid state switch based on the detection of the absence of current limiting conditions in the SSPC.

2. The EPGS of claim 1, wherein the generator comprises a permanent magnet generator, and wherein the EPGS further comprises an active rectifier located between the generator and the decoupling filter.

3. The EPGS of claim 1, wherein the generator comprises an induction generator, and wherein the EPGS further comprises a converter located between the generator and the decoupling filter.

4. The EPGS of claim 1, wherein the generator comprises a wound field synchronous generator, and wherein the EPGS further comprises a passive rectifier located between the generator and the decoupling filter.

5. The EPGS of claim 4, further comprising a generator control unit connected between the generator and a point between the passive rectifier and the decoupling filter.

6. The EPGS of claim 1, wherein the power distribution module comprises a plurality of SSPCs, each connected to a respective DC load, and wherein the current limiting conditions are detected in at least one SSPC of the plurality of SSPCs.

7. The EPGS of claim 1, wherein the SSPC further comprises a current sensor located between the output filter and the DC load, wherein detection of current limiting conditions in the SSPC is performed based on the current sensor; and
   the output filter further comprises a third inductor connected between the main solid state switch and the first inductor, and a capacitor connected between a common voltage and a point that is located between the third inductor and the first inductor.

8. The EPGS of claim 7, wherein, based on detection of current limiting conditions in the SSPC by the current sensor, pulse width modulating the main solid state switch to limit a load current across the SSPC.

9. A method for operating an electric power generating system (EPGS), the EPGS comprising a decoupling filter and a power distribution module comprising a solid state power converter (SSPC), the method comprising:
   detecting current limiting conditions in the SSPC, wherein the SSPC comprises a main solid state switch in series with an output filter, the output filter comprising a first inductor connected in parallel with a first resistor and a first solid state switch, the first resistor and first solid state switch being connected in series, and wherein the decoupling filter is connected between a generator and the power distribution module and comprises a second inductor connected in parallel with a second resistor and a second solid state switch, the second resistor and second solid state switch being connected in series;
   based on the detection of the current limiting conditions in the SSPC, opening the first solid state switch and the second solid state switch;
   detecting an absence of current limiting conditions in the SSPC; and
   based on the detection of the absence of current limiting conditions in the SSPC, closing the first solid state switch and the second solid state switch, and powering a direct current (DC) load by the generator via the output filter and the SSPC.

10. The method of claim 9, wherein the generator comprises a permanent magnet generator, and wherein the EPGS further comprises an active rectifier located between the generator and the decoupling filter.

11. The method of claim 9, wherein the generator comprises an induction generator, and wherein the EPGS further comprises a converter located between the generator and the decoupling filter.

12. The method of claim 9, wherein the generator comprises a wound field synchronous generator, and wherein the EPGS further comprises a passive rectifier located between the generator and the decoupling filter.

13. The method of claim 12, further comprising a generator control unit connected between the generator and a point between the passive rectifier and the decoupling filter.

14. The method of claim 9, wherein the power distribution module comprises a plurality of SSPCs, each connected to a respective DC load, and wherein the current limiting conditions are detected in at least one SSPC of the plurality of SSPCs.

15. The method of claim 9, wherein the SSPC further comprises a current sensor located between the output filter and the DC load, wherein detection of current limiting conditions in the SSPC is performed based on the current sensor; and
   the output filter further comprises a third inductor connected between the main solid state switch and the first inductor, and a capacitor connected between a common voltage and a point that is located between the third inductor and the first inductor.

16. The method of claim 15, further comprising, based on detection of current limiting conditions in the SSPC by the current sensor, pulse width modulating the main solid state switch to limit a load current across the SSPC.

17. The EPGS of claim 1, wherein the current limiting conditions comprise one of a precharge of a capacitor in the DC load that is connected to the SSPC and a short in the DC load that is connected to the SSPC.

18. The method of claim 9, wherein the current limiting conditions comprise one of a precharge of a capacitor in the DC load that is connected to the SSPC and a short in the DC load that is connected to the SSPC.

19. The EPGS of claim 7, wherein the SSPC further comprises:
   a first diode connected in parallel with the main solid state switch;
   a second diode connected between the common voltage and a point located between the main solid state switch and the third inductor; and
   a third diode connected between the common voltage and a point located between the first inductor and the current sensor.

20. The method of claim 15, wherein the SSPC further comprises:
   a first diode connected in parallel with the main solid state switch;
   a second diode connected between the common voltage and a point located between the main solid state switch and the third inductor; and
   a third diode connected between the common voltage and a point located between the first inductor and the current sensor.

* * * * *